(12) United States Patent
Webb et al.

(10) Patent No.: US 11,057,479 B1
(45) Date of Patent: Jul. 6, 2021

(54) CONTEXTUAL ROUTING CONFIGURATION AND SERVICE NAMING FOR MULTI-CLUSTER SERVICE MESH

(71) Applicant: Intuit Inc., Mountain View, CA (US)

(72) Inventors: Jason Michael Webb, San Diego, CA (US); Anil Kumar Attuluri, San Diego, CA (US); Laurent R. Benchimol, San Diego, CA (US); Joseph Seng Peacock, San Diego, CA (US); Viraj Raghunath Kulkarni, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 74 days.

(21) Appl. No.: 16/730,545

(22) Filed: Dec. 30, 2019

(51) Int. Cl.
*H04L 29/08* (2006.01)
*H04L 29/12* (2006.01)
*H04L 12/24* (2006.01)
*H04L 12/26* (2006.01)

(52) U.S. Cl.
CPC .......... *H04L 67/16* (2013.01); *H04L 41/0668* (2013.01); *H04L 41/0893* (2013.01); *H04L 43/0817* (2013.01); *H04L 61/3015* (2013.01)

(58) Field of Classification Search
CPC . H04L 67/16; H04L 61/3015; H04L 41/0893; H04L 43/0817; H04L 41/0668
USPC ........................................................ 370/218
See application file for complete search history.

(56) References Cited

U.S. PATENT DOCUMENTS

| 10,069,788 B1* | 9/2018 | Earl ........................ H04L 69/40 |
| 2006/0046752 A1* | 3/2006 | Kalavade ................ H04W 4/12 |
| | | 455/466 |
| 2016/0191325 A1* | 6/2016 | Pacella ................... H04L 45/04 |
| | | 370/254 |

OTHER PUBLICATIONS

GitHub, Inc., "Coddiwomple: a Multi-Cluster-Config Generator"; <https://github.com/istio-ecosystem/coddiwomple>, Accessed Oct. 9, 2019 (4 pages).
GitHub, Inc., "wharf-multicluster-sync: User friendly Multicluster Istio configuration"; <https://github.com/istio-ecosystem/wharf-multicluster-sync>, Accessed Oct. 9, 2019 (2 pages).

* cited by examiner

*Primary Examiner* — Meng Vang
(74) *Attorney, Agent, or Firm* — Ferguson Braswell Fraser Kubasta PC

(57) ABSTRACT

A method may include obtaining a first dependency of a first calling service on a called service and a second dependency of a second calling service on the called service. The method may further include generating a first routing configuration for the first calling service that maps a name of the called service to an ingress point of a first cluster, generating a second routing configuration for the second calling service that maps the name of the called service to the ingress point of the first cluster, detecting a relocation of the called service to a second cluster, modifying the first routing configuration to map the name of the called service to an ingress point of the second cluster, and modifying the second routing configuration to map the name of the called service to a local name of the called service within a namespace of the second cluster.

20 Claims, 7 Drawing Sheets

Policy 400

```
apiVersion: intuit.com/v1
kind: GlobalTrafficPolicy
metadata:
  name: gtp-Company.identity.server-e2e
spec:
  selector:
    identity: Company.identity.server
    env: stage
  policy:
    - dns: server-stage.mesh
      lbtype: TOPOLOGY
    - dns: server-stage-uswest2.mesh
      lbtype: FAILOVER
      target:
        - region: uswest-2
          weight: 100
        - region: useast-2
          weight: 0
    - dns: server-stage-useast2.mesh
      lbtype: FAILOVER
      target:
        - region: useast-2
          weight: 0
        - region: uswest-2
          weight: 100
```

Called Service Name 402 → identity: Company.identity.server

Rules 404

CONTEXTUAL ROUTING CONFIGURATION AND SERVICE NAMING FOR MULTI-CLUSTER SERVICE MESH

BACKGROUND

Multiple possible topologies exist for distributing the services of an application beyond a single cluster of computing nodes. For example, services within a service "mesh" may use service entries provided by the mesh to access services external to the mesh and/or to access services exposed by another mesh, where the system of meshes is called a mesh federation. Alternatively, services from multiple clusters may be combined into a single composite service mesh called a multi-cluster mesh. No automated solution currently exists for managing service routing configurations and naming in a large-scale, dynamically changing service mesh. For example, when ownership of a service binary is relocated, it may be disruptive to require callers of the service to use a new name to refer to the relocated service.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for adapting a contextual routing configuration including obtaining a first dependency of a first calling service on a called service and a second dependency of a second calling service on the called service. The first calling service is hosted in a first cluster. The called service is hosted in a second cluster. The second calling service is hosted in a third cluster. The method further includes generating, using the first dependency, a first contextual routing configuration for the first calling service that maps a name of the called service to an ingress point of the second cluster, generating, using the second dependency, a second contextual routing configuration for the second calling service that maps the name of the called service to the ingress point of the second cluster, detecting a relocation of the called service to the third cluster, modifying, after detecting the relocation, the first contextual routing configuration to map the name of the called service to an ingress point of the third cluster, thereby obtaining a modified first contextual routing configuration, and modifying, after detecting the relocation, the second contextual routing configuration to map the name of the called service to a local name of the called service within a namespace of the third cluster, thereby obtaining a modified second contextual routing configuration.

In general, in one aspect, one or more embodiments relate to a system for adapting a contextual routing configuration including a first cluster, a second cluster, a third cluster, and a fourth cluster. The fourth cluster is configured to store a first dependency of a first calling service on a called service and a second dependency of a second calling service on the called service. The first calling service is hosted in a first cluster. The called service is hosted in a second cluster. The second calling service is hosted in a third cluster. The system further includes a contextual configuration manager executing on the fourth cluster and configured to obtain the first dependency and the second dependency, generate, using the first dependency, a first contextual routing configuration for the first calling service that maps a name of the called service to an ingress point of the second cluster, generate, using the second dependency, a second contextual routing configuration for the second calling service that maps the name of the called service to the ingress point of the second cluster, detect a relocation of the called service to the third cluster, modify, after detecting the relocation, the first contextual routing configuration to map the name of the called service to an ingress point of the third cluster, thereby obtaining a modified first contextual routing configuration, and modify, after detecting the relocation, the second contextual routing configuration to map the name of the called service to a local name of the called service within a namespace of the third cluster, thereby obtaining a modified second contextual routing configuration.

In general, in one aspect, one or more embodiments relate to a non-transitory computer readable medium including instructions that, when executed by a computer processor, perform: obtaining a first dependency of a first calling service on a called service and a second dependency of a second calling service on the called service. The first calling service is hosted in a first cluster. The called service is hosted in a second cluster. The second calling service is hosted in a third cluster. The instructions further perform generating, using the first dependency, a first contextual routing configuration for the first calling service that maps a name of the called service to an ingress point of the second cluster, generating, using the second dependency, a second contextual routing configuration for the second calling service that maps the name of the called service to the ingress point of the second cluster, detecting a relocation of the called service to the third cluster, modifying, after detecting the relocation, the first contextual routing configuration to map the name of the called service to an ingress point of the third cluster, thereby obtaining a modified first contextual routing configuration, and modifying, after detecting the relocation, the second contextual routing configuration to map the name of the called service to a local name of the called service within a namespace of the third cluster, thereby obtaining a modified second contextual routing configuration.

Other aspects of the invention will be apparent from the following description and the appended claims.

BRIEF DESCRIPTION OF DRAWINGS

FIG. 3A, FIG. 3B, and FIG. 4 show examples in accordance with one or more embodiments of the invention.

DETAILED DESCRIPTION

Figure 1A:
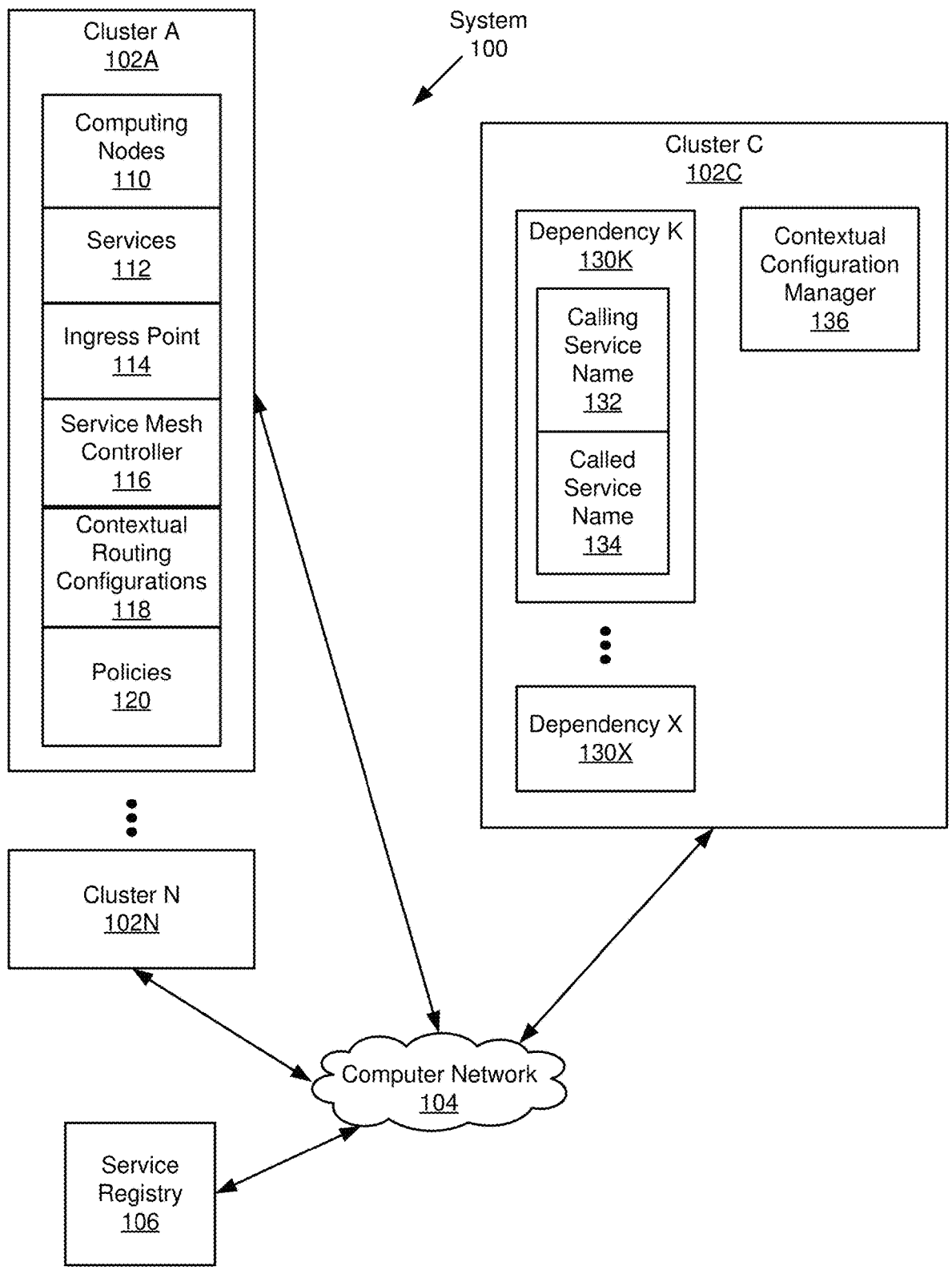
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to generating a contextual routing configuration for a software application. The contextual routing configuration may be used by a software application to access services deployed among various clusters of computing nodes in an enterprise service mesh without knowing where the services are currently hosted. For example, the software application may be a financial application that requires timely response from a fraud detection service and a customer notification service, both of which call an authentication service to assure that that user credentials are legitimate. The contextual routing configuration isolates the software application from the details of where services are deployed and/or relocated within the enterprise service mesh. The isolation eliminates the overhead associated with adjusting how calls are routed to services when services are deployed and/or relocated. For example, the overhead associated with manual adjustment may be substantial for a large-scale enterprise service mesh that includes many services.

The smooth running of the enterprise service mesh may be enforced by compliance with policies associated with the services. For example, a load balancing policy associated with a service may specify how workloads are to be distributed among multiple servers hosting the service. Moreover, a failover policy may specify a backup server to handle requests for the service when a primary server fails. Automatic adjustment of contextual routing configurations permits policies associated with services to remain in force when services are redeployed and/or relocated, thereby preventing even a temporary disruption of service (e.g., due to the failure of a primary server or due to overloading a server). Thus, automatically adjusting routing configurations enables a smooth transition, based on continued enforcement of policies associated with services, in the presence of potentially disruptive events that cause relocation of services. The contextual routing configuration is based on the relative locations of the calling service and the called service (e.g., whether the calling service and the called service reside in the same cluster of computing nodes).

In one or more embodiments, a dependency of a calling service on a called service to support the software application is obtained. When the calling service and the called service are hosted in different clusters of computing nodes, a contextual routing configuration may be generated for the calling service that maps a name of the called service to an ingress point of the cluster hosting the called service. Alternatively, when the calling service and the called service are hosted in the same cluster of computing nodes, the contextual routing configuration maps a name of the called service to a local name of the called service within a namespace of the hosting cluster.

In embodiments, the contextual routing configuration may be generated in response to detecting the deployment of the called service. The contextual routing configuration, once generated, may be delivered (e.g., pushed) to the calling service. When the called service is relocated (e.g., redeployed) to another cluster, the contextual routing configuration is modified to adapt to the relocation of the called service. For example, the cluster hosting the called service may become unavailable (e.g., due to failure or overloading), and an alternate cluster may be designated by a policy to receive requests for the called service. The contextual routing configuration may be modified by mapping the name of the called service to an ingress point of the alternate cluster when the calling service and the relocated called service are hosted in different clusters. Alternatively, when the calling service and the relocated called service are both hosted in the alternate cluster, the contextual routing configuration may be modified by mapping the name of the called service to a local name of the called service within a namespace of the alternate cluster. The modified contextual routing configuration may be delivered to the calling service.

Automatically modifying and delivering contextual routing configurations as services are relocated enables efficient adaptation to a dynamically evolving system (e.g., mesh) of services, an important feature for large-scale systems.

FIG. 1A shows a system (100) in accordance with one or more embodiments of the invention. As shown in FIG. 1A, the system (100) includes clusters (102A, 102N), a computer network (104), and a service registry (106). The clusters (102A, 102N) shown in FIG. 1A may correspond to the computing system (500) described with respect to FIG. 5A and the accompanying description below, or take the form of the client device (526) described with respect to FIG. 5B. In one or more embodiments, the clusters (102A, 102N) may communicate via the computer network (104) (e.g., the network (520) described with respect to FIG. 5B).

In one or more embodiments, a cluster (102A) includes computing nodes (110), services (112), an ingress point (114), a service mesh controller (116), contextual routing configurations (118), and policies (120). The clusters (102A, 102N) may form a trust domain. For example, the clusters (102A, 102N) may share a common certificate authority (CA). The clusters (102A, 102N) may be organized into one or more regions. For example, a region may be a geographic area that includes one or more clusters.

Each of the computing nodes (110) may correspond to the computing system (500) described with respect to FIG. 5A and the accompanying description below, or take the form of the client device (526) described with respect to FIG. 5B. The services (112) may be specialized software components with functionality that may be used by other software components. For example, a calling service may call a called service using a name of the called service. Continuing this example, the name of the called service may be a global name that is used by services (112) in any cluster (102A, 102N) to identify the called service. A service may be called using an application programming interface (API) and/or a communications protocol (e.g., the HyperText Transfer Protocol (HTTP)). Examples of services (112) include: authentication, authorization, libraries, etc. An ingress point (114) receives communications from entities external to the cluster (102A). For example, communications sent from a first cluster to a second cluster may be received by the ingress point (114) of the second cluster. The ingress point (114) may be a gateway. A service mesh controller (116) may manage and/or route communications traffic within the cluster (102A) related to accessing the services (112). Each cluster (102A) may be thought of as a service mesh. The service mesh controller (116) may include functionality associated with a control plane, such as deciding where to route packets.

In one or more embodiments, contextual routing configurations (118) are structures that indicate how services (112) call each other. That is, a contextual routing configuration may indicate how a calling service calls a called service. Contextual routing configurations (118) provide a layer of indirection that shields the calling service and the cluster hosting the calling service from the details of where to route calls to the called service. In other words, the calling service simply uses the contextual routing configuration to determine where to route calls to the called service. Thus, the calling service does not need to keep track of where the called service is hosted. For example, the called service may be hosted by different clusters at different points in time. Continuing this example, when a primary hosting cluster indicated in a policy (120) fails, the called service may instead be hosted by a failover cluster. Alternatively, a policy (120) may indicate that requests for the called service be balanced among multiple clusters hosting the called service.

Figure 1B:
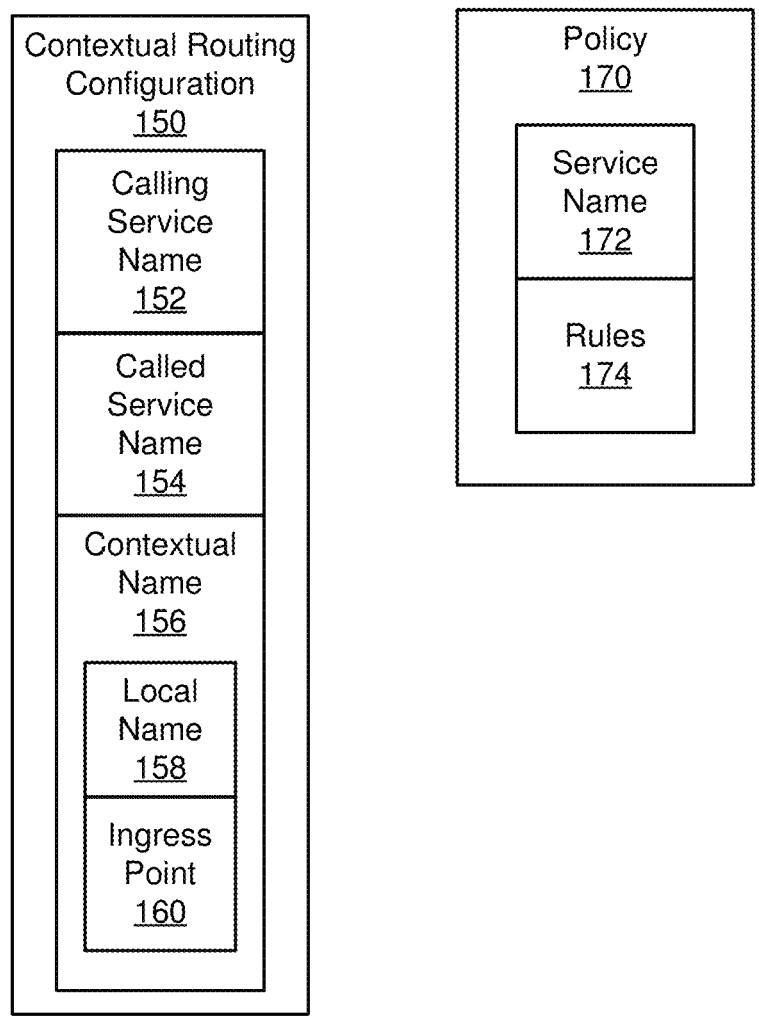

Turning to FIG. 1B, a contextual routing configuration (150) includes a calling service name (152), a called service name (154), and a contextual name (156). The calling service name (152) and the called service name (154) are names (e.g., identifiers) corresponding to the calling service and the called service, respectively. In one or more embodiments, the contextual name (156) is a name specifically used by the calling service to call the called service. The contextual name (156) may be local name (158). For example, the local name (158) may be a name of the called service within a namespace of a specific cluster. Continuing this example, the specific cluster may host the executable code that implements the called service. Further continuing this example, the local name (158) of the called service may be used as the contextual name (156) when both the calling service and the called service are hosted by the same cluster.

Alternatively, the contextual name (156) may be an ingress point (160). For example, the ingress point (160) may be an ingress point (114) of a remote cluster that hosts the executable code that implements the called service. In other words, the ingress point (160) of a remote cluster may be used as the contextual name (156) when the called service is hosted by a cluster different from the cluster hosting the calling service. Thus, different calling services may make use of different contextual names when calling the same called service using the same name. For example, for service X, service Y's name may resolve to a local name when both service X and service Y are hosted in the same cluster C, while a service Z hosted in cluster D may resolve service Y's name to an ingress point of cluster C when calling service Y.

Returning to FIG. 1A, in one or more embodiments, multiple clusters may host a specific service. In one or more embodiments, policies (120) are structures that indicate how requests for services (112) are routed. One or more policies (120) may be used to route requests for a specific service to the clusters hosting the specific service. Returning to FIG. 1B, in one or more embodiments, a policy (170) includes a service name (172) and one or more rules (174). Each rule may indicate the condition(s) under which a request to call the specific service is routed to one or more of the clusters hosting the specific service. Alternatively, a rule may indicate the condition(s) under which a request to call the specific service is routed to a region that includes one or more clusters hosting the specific service.

In one or more embodiments, contextual routing configurations (118) and policies (120) are stored in repositories resident in each cluster (102A, 102N). Each repository may be any type of storage unit and/or device (e.g., a file system, database, collection of tables, or any other storage mechanism) for storing data. Further, the repository may include multiple different storage units and/or devices. The multiple different storage units and/or devices may or may not be of the same type or located at the same physical site.

In one or more embodiments, one of the clusters (102C) includes, in addition to the previously mentioned components of clusters (102A, 102N) (e.g., computing nodes (110), services (112), ingress point (114), service mesh controller (116), contextual routing configurations (118) and/or policies (120)), dependencies (130K, 130X) and a contextual configuration manager (136). Each dependency (130K) includes a calling service name (132) and called service name (134). That is, each dependency (130K) represents the dependency relationship of the calling service on the called service. The dependencies (130K, 130X) may be based on information in the service registry (106). For example, the service registry (106) may be a repository of requests from developers or owners of services (112) for authorization to call other services.

In one or more embodiments, the contextual configuration manager (136) may be implemented in hardware (e.g., circuitry), software, firmware, and/or any combination thereof. The contextual configuration manager (136) may include functionality to generate and/or modify contextual routing configurations (118) using dependencies (130K, 130X). The contextual configuration manager (136) may include functionality to detect the deployment and/or relocation of services (112). The contextual configuration manager (136) may include functionality to deliver contextual routing configurations (118) to one or more clusters (102A, 102N).

While FIG. 1A and FIG. 1B show a configuration of components, other configurations may be used without departing from the scope of the invention. For example, various components may be combined to create a single component. As another example, the functionality performed by a single component may be performed by two or more components.

Figure 2:
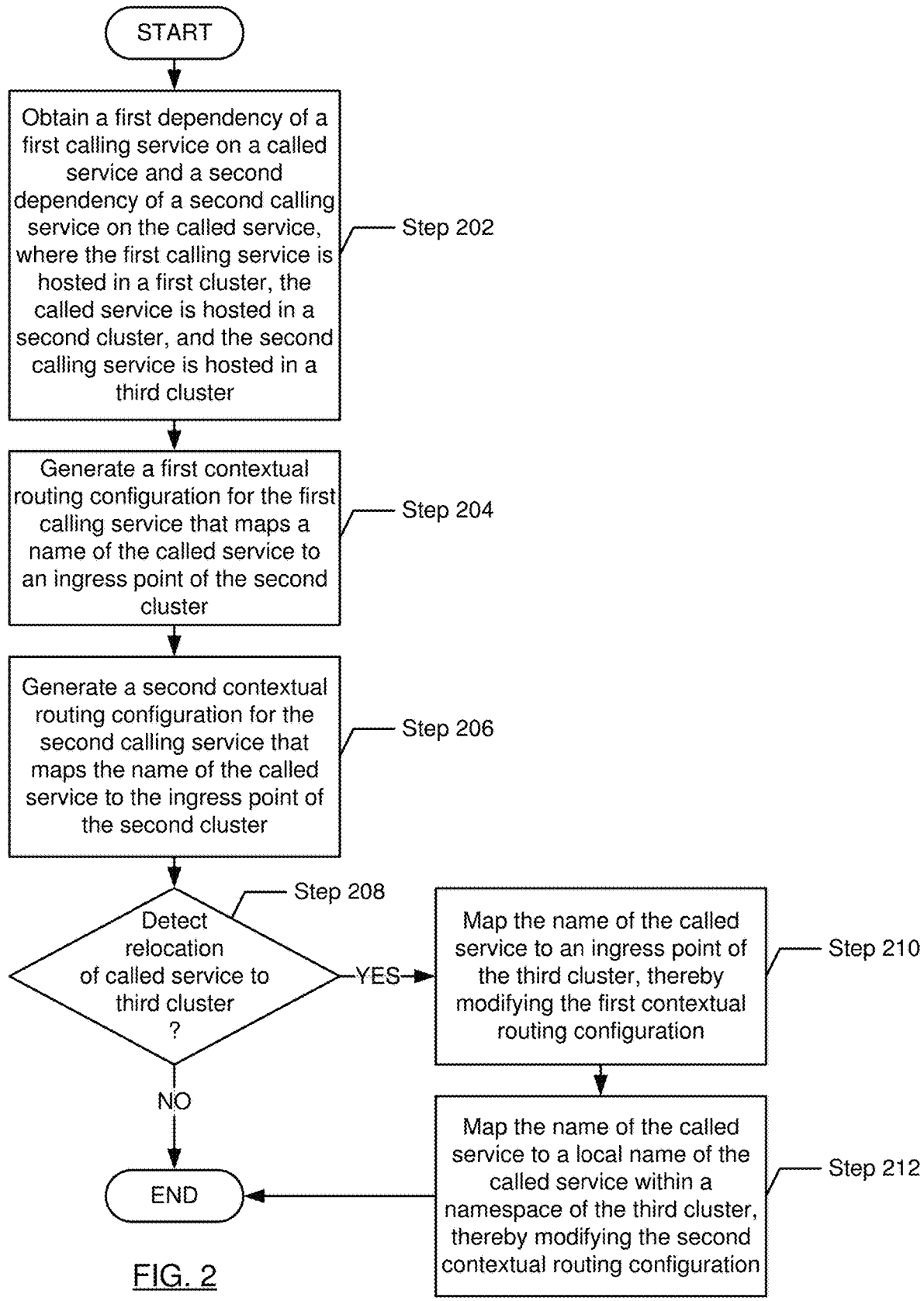
FIG. 2 shows a flowchart in accordance with one or more embodiments of the invention.

FIG. 2 shows a flowchart in accordance with one or more embodiments of the invention. The flowchart depicts a process for adapting a contextual routing configuration. One or more of the steps in FIG. 2 may be performed by the components (e.g., the contextual configuration manager (136) of cluster C (102C) in the system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a first dependency of a first calling service on a called service and a second dependency of a second calling service on the called service are obtained. For example, the first calling service may be a fraud detection service, the second calling service may be a customer notification service, and the called service may be an authentication service. Continuing this example, the fraud detection service and the customer notification service may both be used by a financial application to maintain security and privacy of the important data. The first and second dependencies indicate that the first calling service and the second calling service both call the called service. The first calling service may be hosted in a first cluster, the called service may be hosted in a second cluster, and the second calling service may be hosted in a third cluster. The contextual configuration manager may obtain the first and second dependencies from a repository.

In Step 204, a first contextual routing configuration is generated, using the first dependency, for the first calling service that maps a name of the called service to an ingress point of the second cluster. The first calling service (e.g., fraud detection service) may call the called service (e.g., authentication service) using the contextual name included in the first contextual routing configuration. In one or more embodiments, the contextual configuration manager determines the contextual name of the called service based on whether the second cluster hosts the first calling service, in addition to hosting the called service. When the calling service and called service are hosted in different clusters, the contextual name will be an ingress point of the cluster hosting the called service. Since the second cluster hosts the called service but the second cluster does not host the first calling service, the contextual configuration manager maps the name of the called service to an ingress point of the second cluster.

Alternatively, when the first calling service and the called service are hosted in the same cluster, the contextual name will be a local name of the called service within a namespace of the hosting cluster (see description of Step 212 below).

Once the first contextual routing configuration is generated, the contextual configuration manager may deliver the first contextual routing configuration to the first calling service. Alternatively, the contextual configuration manager may deliver the first contextual routing configuration to the service mesh controller of the first cluster. For example, the service mesh controller may route the call to the called service using the contextual name included in the first contextual routing configuration.

In one or more embodiments, the contextual configuration manager generates multiple contextual routing configurations for the first calling service. For example, the called service may be hosted by multiple clusters, and a policy may be used to select one of the multiple clusters to route the call for the called service. Continuing this example, the policy may be a load balancing policy specifying that, regardless of which cluster hosts the first calling service, calls for the called service be distributed evenly among the multiple clusters hosting the called service. Alternatively, the policy may specify that one cluster is a primary hosting cluster that receives all calls for the called service unless the primary hosting cluster is unavailable, in which case the policy designates a failover cluster. In one or more embodiments, the policy specifies a primary hosting region and a failover region instead of a primary hosting cluster and a failover cluster.

In one or more embodiments, the contextual configuration manager generates the first contextual routing configuration in response to detecting the deployment of the called service. For example, the contextual configuration manager may monitor service deployment events occurring in clusters throughout the system.

In Step 206, a second contextual routing configuration is generated, using the second dependency, for the second calling service that maps the name of the called service to the ingress point of the second cluster (see description of Step 204 above).

If, in Step 208, a relocation of the called service to the third cluster is detected, then Step 210 and Step 212 below are performed. In one or more embodiments, the contextual configuration manager detects the relocation of the called service during the course of monitoring service deployment and/or redeployment events occurring in clusters throughout the system. For example, the second cluster may be a primary hosting cluster designated by a policy to receive requests for the called service, and the third cluster may be a failover cluster designated by the policy to receive requests for the called service when the primary hosting cluster has failed or has become unavailable (e.g., overloaded). The relocation may be performed and/or detected in response to detecting the failure of the second (e.g., primary hosting) cluster.

In Step 210, the name of the called service is mapped to an ingress point of the third cluster, thereby modifying the first contextual routing configuration. The contextual configuration manager may modify the first contextual routing configuration to adapt to the relocation (e.g., redeployment) of the called service. Since the third cluster hosts the now-relocated called service (e.g., authentication service) but the third cluster does not host the first calling service (e.g., fraud detection service), the contextual configuration manager modifies the first contextual routing configuration to map the name of the called service to an ingress point of the third cluster (see description of Step 204 above). Once the first contextual routing configuration is modified, the contextual configuration manager may deliver the modified first contextual routing configuration to the first calling service. Alternatively, the contextual configuration manager may deliver the modified first contextual routing configuration to the service mesh controller of the first cluster.

In Step 212, the name of the called service is mapped to a local name of the called service within a namespace of the third cluster, thereby modifying the second contextual routing configuration. The contextual configuration manager may modify the second contextual routing configuration to adapt to the relocation of the called service. Since the third cluster hosts both the now-relocated called service (e.g., authentication service) and the second calling service (e.g., customer notification service), the contextual configuration manager modifies the second contextual routing configuration to map the name of the called service to the local name of the called service within the namespace of the third cluster (see description of Step 204 above). Once the second contextual routing configuration is modified, the contextual configuration manager may deliver the modified second contextual routing configuration to the second calling service.

Figure 3A:
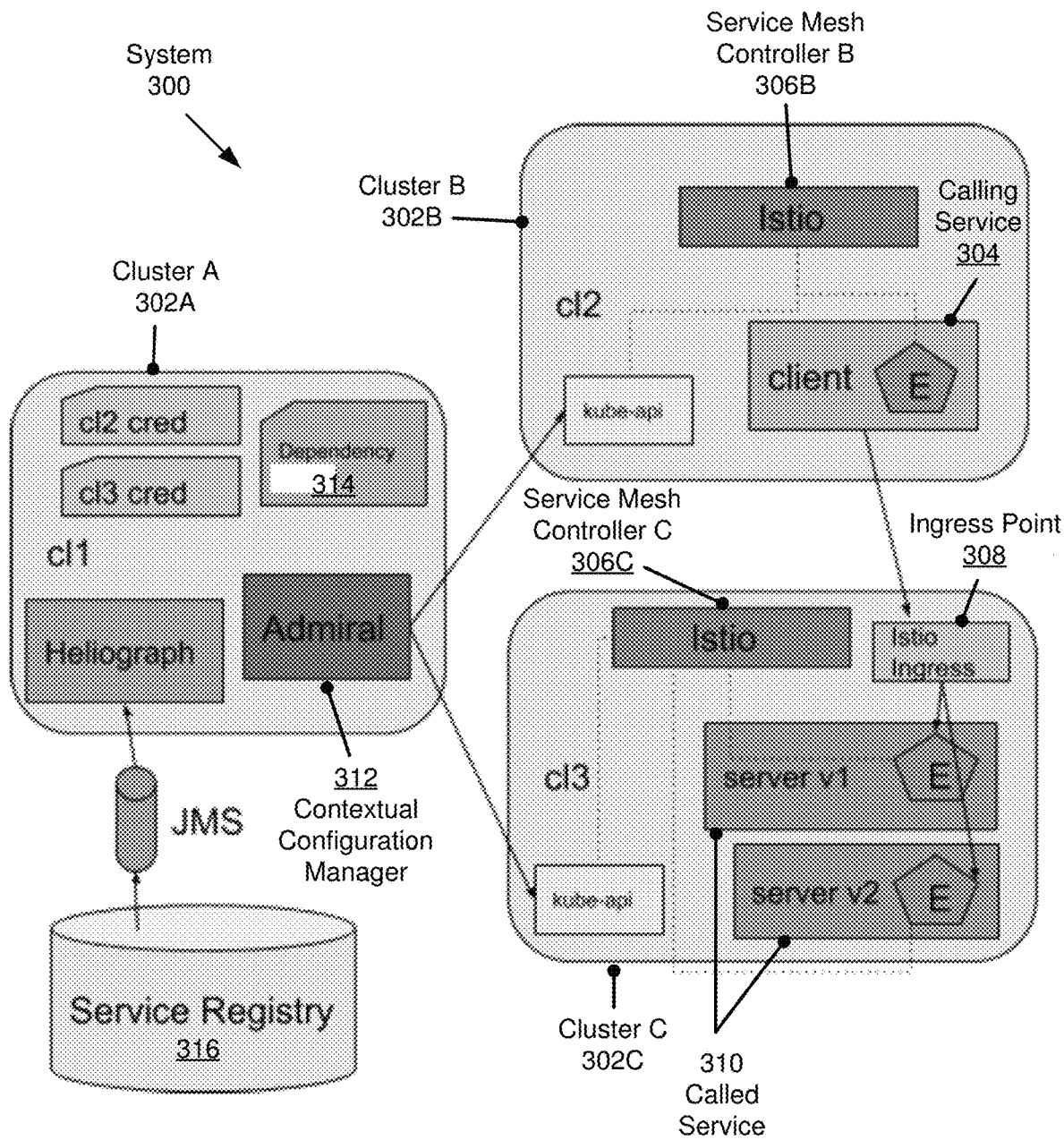
Figure 3B:
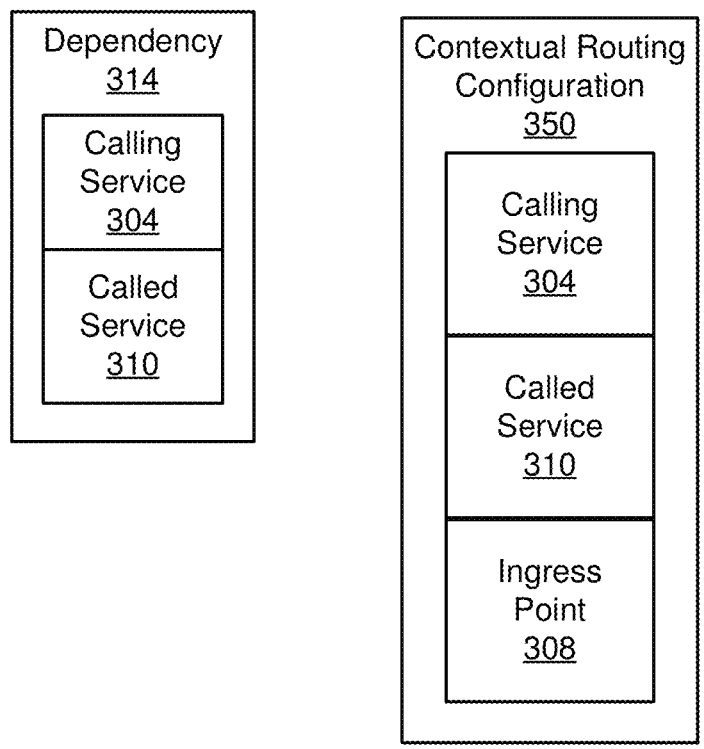

The following examples are for explanatory purposes only and not intended to limit the scope of the invention. FIG. 3A, FIG. 3B, and FIG. 4 show an implementation example in accordance with one or more embodiments of the invention. FIG. 3A shows a system (300) ((100) in FIG. 1A) that includes clusters (302A, 302B, 302C) ((102A, 102C, 102N) in FIG. 1A) and a service registry (316) ((106) in FIG. 1A). Cluster B (302B) hosts a calling service (304) ((112) in FIG. 1A) and includes a service mesh controller (306B) ((116) in FIG. 1A). The calling service (304) is implemented by a computing node of cluster B (302B). Cluster C (302C) hosts a called service (310) ((112) in FIG. 1A), and includes an ingress point (308) ((114) in FIG. 1A) and a service mesh controller (306C) ((116) in FIG. 1A). FIG. 3A shows that the called service (310) is implemented by two computing nodes of cluster C (302C). Cluster A (302A) includes a contextual configuration manager (312) ((136) in FIG. 1A) and a dependency (314) ((130K, 130X) in FIG. 1A).

After the detecting the deployment of the calling service (304) in cluster B (302B) and the deployment of the called service (310) in cluster C (302C), the contextual configuration manager (312) obtains the dependency (314) of the calling service (304) on the called service (310), as shown in FIG. 3B. The dependency (314) is generated using information contained in the service registry (316). The service registry (316) includes a record, based on information provided by the owner of the calling service (304), indicating that the calling service (304) requests authorization to call the called service (310).

Since the calling service (304) and the called service (310) are hosted in different clusters (302B, 302C), the contextual configuration manager (312) generates a contextual routing configuration (350) ((118) in FIG. 1A and (150) in FIG. 1B) for the calling service (304) that maps the name of the called service (310) to the ingress point (308) of cluster C (302C). Once the contextual routing configuration (350) is generated, the contextual configuration manager (312) delivers the contextual routing configuration (350) to the calling service (304). The calling service (304) uses the ingress point (308) of cluster C (302C) as the contextual name for the called service (310). That is, the calling service (304) transmits the call for the called service (310) to the ingress point (308) of cluster C (302C), which then routes the call to the service mesh controller (306C) of cluster C (302C). The service mesh controller (306C) then looks up the location of the called service (310) in the namespace of cluster C (302C), and routes the call to one of the computing nodes that implement the called service (310).

FIG. 4 shows a policy (400) ((120) in FIG. 1A and (170) in FIG. 1B) that includes a called service name (402) and rules (404). Each of the rules (404) specifies a different contextual name for the called service name (402), where each contextual name corresponds to a different hosting cluster and/or region for the called service. The contextual configuration manager (312) generates contextual routing configurations that include contextual names corresponding to the different hosting clusters. Each contextual routing configuration specifies either an ingress point of the hosting cluster or a local name in a namespace of the hosting cluster, depending on whether the hosting cluster also hosts the service that calls the called service. The contextual routing configurations may be used by the calling service to route calls to the appropriate hosting cluster, based on the application of the policy (400).

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
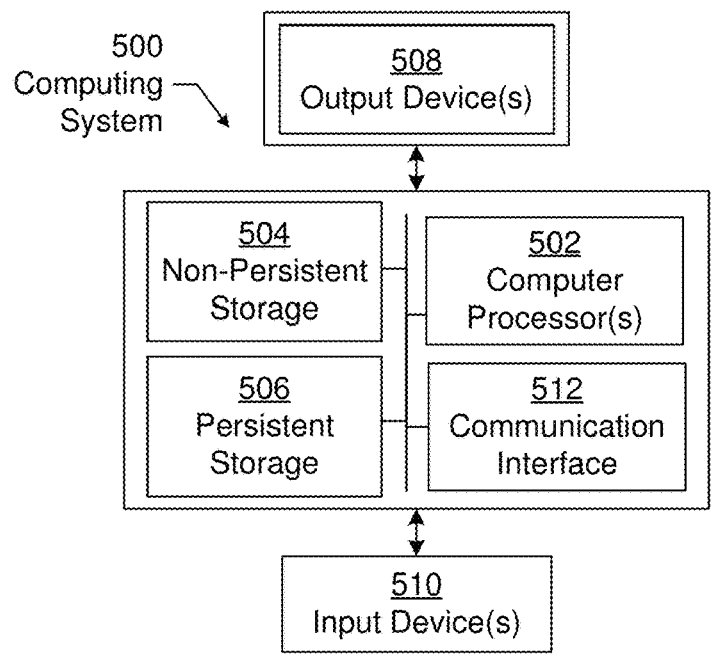
FIG. 5A and FIG. 5B show computing systems in accordance with one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Figure 5B:
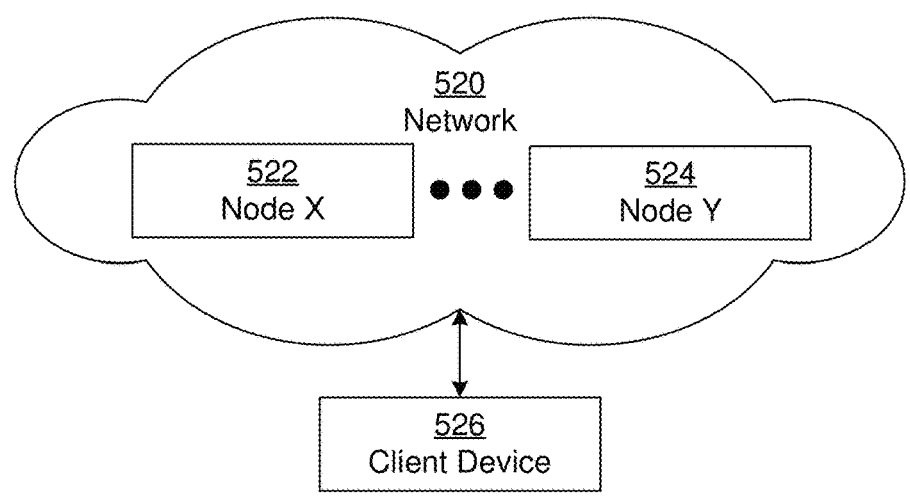

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for adapting a contextual routing configuration, comprising:
   obtaining a first dependency of a first calling service on a called service and a second dependency of a second calling service on the called service,
      wherein the first calling service is hosted in a first cluster,
      wherein the called service is hosted in a second cluster, and
      wherein the second calling service is hosted in a third cluster;
   generating, using the first dependency, a first contextual routing configuration for the first calling service that maps a name of the called service to an ingress point of the second cluster;
   generating, using the second dependency, a second contextual routing configuration for the second calling service that maps the name of the called service to the ingress point of the second cluster;
   detecting a relocation of the called service to the third cluster;

modifying, after detecting the relocation, the first contextual routing configuration to map the name of the called service to an ingress point of the third cluster, thereby obtaining a modified first contextual routing configuration; and modifying, after detecting the relocation, the second contextual routing configuration to map the name of the called service to a local name of the called service within a namespace of the third cluster, thereby obtaining a modified second contextual routing configuration.

2. The method of claim 1, further comprising:
delivering, to the first calling service and after detecting the relocation, the modified first contextual routing configuration.

3. The method of claim 1, further comprising:
delivering, to the first calling service and before detecting the relocation, the first contextual routing configuration.

4. The method of claim 1, further comprising:
determining that a policy specifies the second cluster as a primary hosting cluster to receive requests for the called service.

5. The method of claim 4, wherein the policy specifies the third cluster as a failover cluster to receive requests for the called service when the primary hosting cluster is unavailable.

6. The method of claim 1, further comprising:
detecting a failure of the second cluster, wherein the relocation is performed in response to detecting the failure.

7. The method of claim 1, further comprising:
detecting a deployment of the called service, wherein the first contextual routing configuration and the second contextual routing configuration are generated in response to detecting the deployment.

8. A system for adapting a contextual routing configuration, comprising:
a first cluster, a second cluster, a third cluster, and a fourth cluster comprising a computer processor and memory, wherein the fourth cluster is configured to store:
a first dependency of a first calling service on a called service, and
a second dependency of a second calling service on the called service,
wherein the first calling service is located in the first cluster,
wherein the called service is located in the second cluster, and
wherein the second calling service is located in the third cluster; and
a contextual configuration manager executing on the fourth cluster and configured to:
obtain the first dependency and the second dependency,
generate, using the first dependency, a first contextual routing configuration for the first calling service that maps a name of the called service to an ingress point of the second cluster,
generate, using the second dependency, a second contextual routing configuration for the second calling service that maps the name of the called service to the ingress point of the second cluster,
detect a relocation of the called service to the third cluster,
modify, after the relocation is detected, the first contextual routing configuration to map the name of the called service to an ingress point of the third cluster, thereby obtaining a modified first contextual routing configuration by, and modify, after the relocation is detected, the second contextual routing configuration to map the name of the called service to a local name of the called service within a namespace of the third cluster, thereby obtaining a modified second contextual routing configuration.

9. The system of claim 8, wherein the contextual configuration manager is further configured to:
deliver, to the first calling service and after detecting the relocation, the modified first contextual routing configuration.

10. The system of claim 8, wherein the contextual configuration manager is further configured to:
deliver, to the first calling service and before detecting the relocation, the first contextual routing configuration.

11. The system of claim 8, wherein the contextual configuration manager is further configured to:
determine that a policy specifies the second cluster as a primary hosting cluster to receive requests for the called service.

12. The system of claim 11, wherein the policy specifies the third cluster as a failover cluster to receive requests for the called service when the primary hosting cluster is unavailable.

13. The system of claim 8, wherein the contextual configuration manager is further configured to:
detect a failure of the second cluster, wherein the relocation is performed in response to detecting the failure.

14. The system of claim 8, wherein the contextual configuration manager is further configured to:
detect a deployment of the called service, wherein the first contextual routing configuration and the second contextual routing configuration are generated in response to detecting the deployment.

15. A non-transitory computer readable medium comprising instructions that, when executed by a computer processor, perform:
obtaining a first dependency of a first calling service on a called service and a second dependency of a second calling service on the called service,
wherein the first calling service is hosted in a first cluster,
wherein the called service is hosted in a second cluster, and
wherein the second calling service is hosted in a third cluster;
generating, using the first dependency, a first contextual routing configuration for the first calling service that maps a name of the called service to an ingress point of the second cluster;
generating, using the second dependency, a second contextual routing configuration for the second calling service that maps the name of the called service to the ingress point of the second cluster;
detecting a relocation of the called service to the third cluster;
modifying, after detecting the relocation, the first contextual routing configuration to map the name of the called service to an ingress point of the third cluster, thereby obtaining a modified first contextual routing configuration; and
modifying, after detecting the relocation, the second contextual routing configuration to map the name of the called service to a local name of the called service within a namespace of the third cluster, thereby obtaining a modified second contextual routing configuration.

16. The non-transitory computer readable medium of claim 15, further comprising instructions that perform:
delivering, to the first calling service and after detecting the relocation, the modified first contextual routing configuration.

17. The non-transitory computer readable medium of claim 15, further comprising instructions that perform:
delivering, to the first calling service and before detecting the relocation, the first contextual routing configuration.

18. The non-transitory computer readable medium of claim 15, further comprising instructions that perform:
determining that a policy specifies the second cluster as a primary hosting cluster to receive requests for the called service.

19. The non-transitory computer readable medium of claim 18, wherein the policy specifies the third cluster as a failover cluster to receive requests for the called service when the primary hosting cluster is unavailable.

20. The non-transitory computer readable medium of claim 15, further comprising instructions that perform:
detecting a failure of the second cluster, wherein the relocation is performed in response to detecting the failure.

* * * * *